US009452542B2

(12) United States Patent
Nubson et al.

(10) Patent No.: US 9,452,542 B2
(45) Date of Patent: Sep. 27, 2016

(54) CARD OVERLAY TRIMMER

(71) Applicant: DATACARD CORPORATION, Minnetonka, MN (US)

(72) Inventors: Richard C. Nubson, Lakeville, MN (US); David A. Adkins, Eden Prairie, MN (US); Timothy J. Flitsch, Lakeville, MN (US)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 194 days.

(21) Appl. No.: 14/230,503

(22) Filed: Mar. 31, 2014

(65) Prior Publication Data

US 2014/0332152 A1  Nov. 13, 2014

Related U.S. Application Data

(60) Provisional application No. 61/822,481, filed on May 13, 2013.

(51) Int. Cl.
| | |
|---|---|
| *B26D 1/04* | (2006.01) |
| *B26D 5/00* | (2006.01) |
| *B26D 5/34* | (2006.01) |
| *B26D 7/01* | (2006.01) |

(52) U.S. Cl.
CPC .............. *B26D 1/04* (2013.01); *B26D 5/007* (2013.01); *B26D 5/34* (2013.01); *B26D 7/018* (2013.01); *B26F 2210/06* (2013.01); *Y10T 83/0259* (2015.04); *Y10T 156/1052* (2015.01); *Y10T 156/1348* (2015.01)

(58) Field of Classification Search
CPC .............. B26D 1/04; Y10T 156/1052; Y10T 156/1057; Y10T 83/0259; B26F 2210/06
See application file for complete search history.

(56) References Cited

U.S. PATENT DOCUMENTS

| | | | | |
|---|---|---|---|---|
| 4,312,255 | A | | 1/1982 | Holmstrom |
| 5,163,008 | A | * | 11/1992 | Gerber ................ B26D 7/015 226/27 |
| 5,397,415 | A | * | 3/1995 | Manabe ................ B26D 3/08 156/234 |
| 5,785,355 | A | * | 7/1998 | Main ................... B42D 25/00 283/102 |
| 5,931,071 | A | * | 8/1999 | Mori .................... B26D 3/10 83/582 |
| 2002/0153093 | A1 | | 10/2002 | Cook |
| 2005/0134036 | A1 | | 6/2005 | Trimble et al. |
| 2006/0086227 | A1 | * | 4/2006 | Shimizu ................ B26D 1/04 83/651 |
| 2011/0126681 | A1 | | 6/2011 | Blanchet et al. |

FOREIGN PATENT DOCUMENTS

EP        0861813        6/2002

OTHER PUBLICATIONS

International Search Report and Written Opinion for International Application No. PCT/US2014/032361, mailed Sep. 11, 2014, 12 pgs.

* cited by examiner

*Primary Examiner* — Mark A Osele
*Assistant Examiner* — Christopher C Caillouet
(74) *Attorney, Agent, or Firm* — Hamre, Schumann, Mueller & Larson, P.C.

(57) ABSTRACT

Systems and methods for utilizing a trimming device to trim an edge of a plastic card having round corners, are provided. The plastic card has an overlay laminated on a major surface of the plastic card. The periphery of the overlay overhangs the edge of the plastic card. The trimming device trims the overhanging part of the laminated overlay by moving the trimming device along the edge of the personalized document in a direction generally parallel to the major surface of the plastic card.

6 Claims, 8 Drawing Sheets

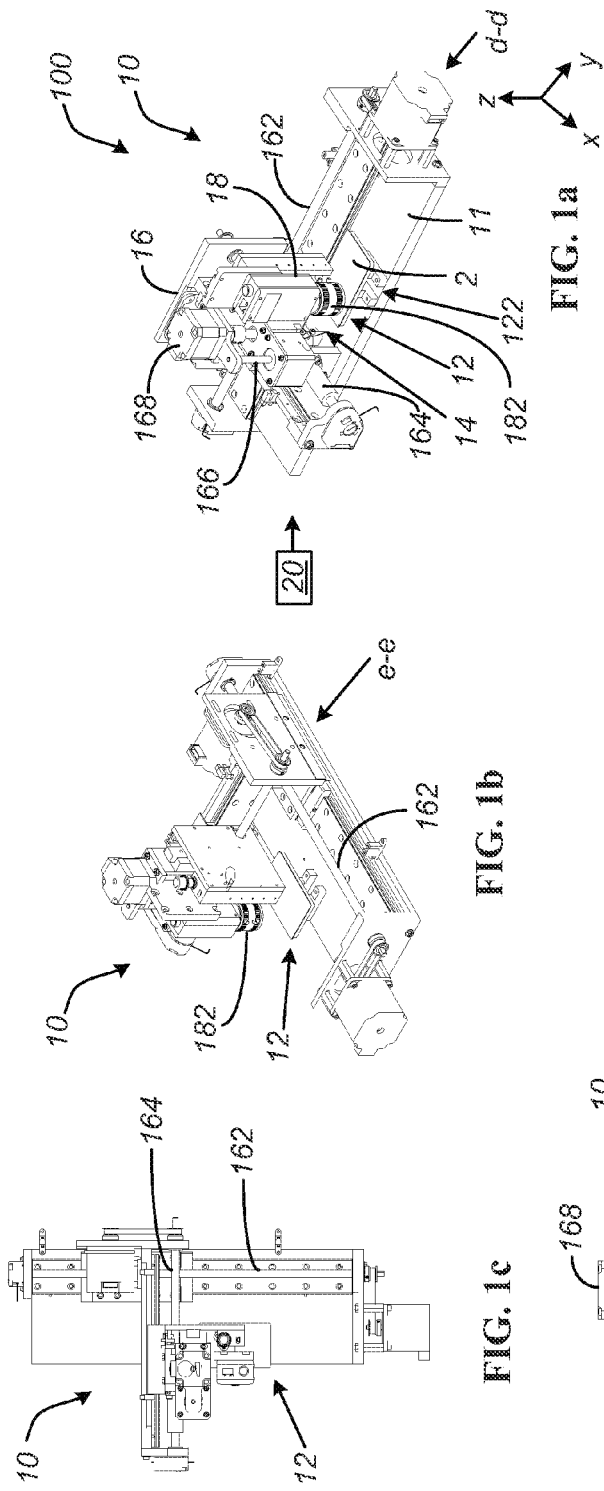

CARD OVERLAY TRIMMER

FIELD

This disclosure relates to systems and methods of preparing personalized documents, such as plastic cards including, for example, identification cards, credit and debit cards, and the like. More particularly, this disclosure relates to utilizing a trimmer to process a personalized document.

BACKGROUND

Personalized documents such as identification cards, credit and debit cards, driver's licenses, and the like, can have a regular shape such as, for example, a rectangular shape with curved corners. Some of the cards may have an overlay or overlay laminated on a substrate. The overlay needs to conform to the substrate.

SUMMARY

Systems and methods for utilizing a trimming system or a trimmer to process a personalized document, are provided. The personalized document includes, but is not limited to, identification cards, driver's licenses, credit and debit cards, and the like.

In some embodiments, a personalized document such as, for example, a plastic card, includes a major surface laminated with an overlay. The laminated overlay may have a periphery that can overhang the edge of the personalized document. The embodiments described herein can trim, via a trimming device, an overhanging part of the laminated overlay by moving the trimming device along the edge of the personalized document in a direction generally parallel to the major surface of the personalized document. In some embodiments, the trimming device is a mechanical trimming device.

In one embodiment, a method is provided where a trimming device is positioned with respect to a personalized document. The personalized document has a major surface and an edge being a periphery of the major surface. The edge of the personalized document is trimmed, via the trimming device, by moving the trimming device along the edge of the personalized document in a direction generally parallel to the major surface.

In another embodiment, a method of trimming a round corner of a personalized document is provided. A trimming device is positioned with respect to the personalized document that has a major surface and an edge being a periphery of the major surface. The edge includes a round corner. The round corner of the personalized document is trimmed, via the trimming device, by rotating the trimming device around the round corner.

In another embodiment, a system for preparing a personalized document is provided. The system includes a trimming unit configured to trim an edge of the personalized document. The trimming unit includes a trimming device, a mounting mechanism configured to mount the personalized document and positioning the personalized document with respect to the trimming device, and a manipulating mechanism configured to manipulate the trimming device and/or the personalized document so that the trimming device moves along the edge of the personalized document to trim the edge thereof.

In another embodiment, a trimming system for trimming an edge of a personalized document is provided. The personalized document includes a major surface. The edge is a periphery of the major surface. The trimming system includes a trimming device, a mounting mechanism configured to mount the personalized document and positioning the personalized document with respect to the trimming device, and a manipulating mechanism configured to manipulate the trimming device and/or the personalized document so that the trimming device moves along the edge of the personalized document in a direction generally parallel to the major surface to trim the edge thereof.

The term "trim" or "trimming" used herein refers to a process of defining a periphery (e.g., an edge, a corner) of a personalized document. The process of trimming can include, for example, removing an overhanging periphery of an overlay that is laminated on the personalized document, cutting a periphery of a personalized document, cutting a personalized document from a substrate, dividing a substrate into multiple personalized documents, etc.

The term "edge" used herein refers to a periphery of a personalized document. It is to be appreciated that an edge includes a round corner.

As used herein, "moving the trimming device along the edge of the personalized document" includes moving the trimming device and/or the personalized document.

DRAWINGS

FIG. 1a illustrates a perspective front view of a system for preparing a personalized document, according to one embodiment.

FIG. 1b illustrates a perspective back view of the system of FIG. 1a.

FIG. 1c illustrates a top view of the system of FIG. 1a.

FIG. 1d illustrates a side view of the system of FIG. 1a along a d-d direction shown in FIG. 1a.

FIG. 1e illustrates a back view of the system of FIG. 1a along an e-e direction shown in FIG. 1b.

FIG. 2b illustrates a top view of the trimming device and the personalized document of FIG. 2a.

FIG. 3b illustrates a top view of the trimming device and the personalized document of FIG. 3a.

DETAILED DESCRIPTION

Figure 2A:
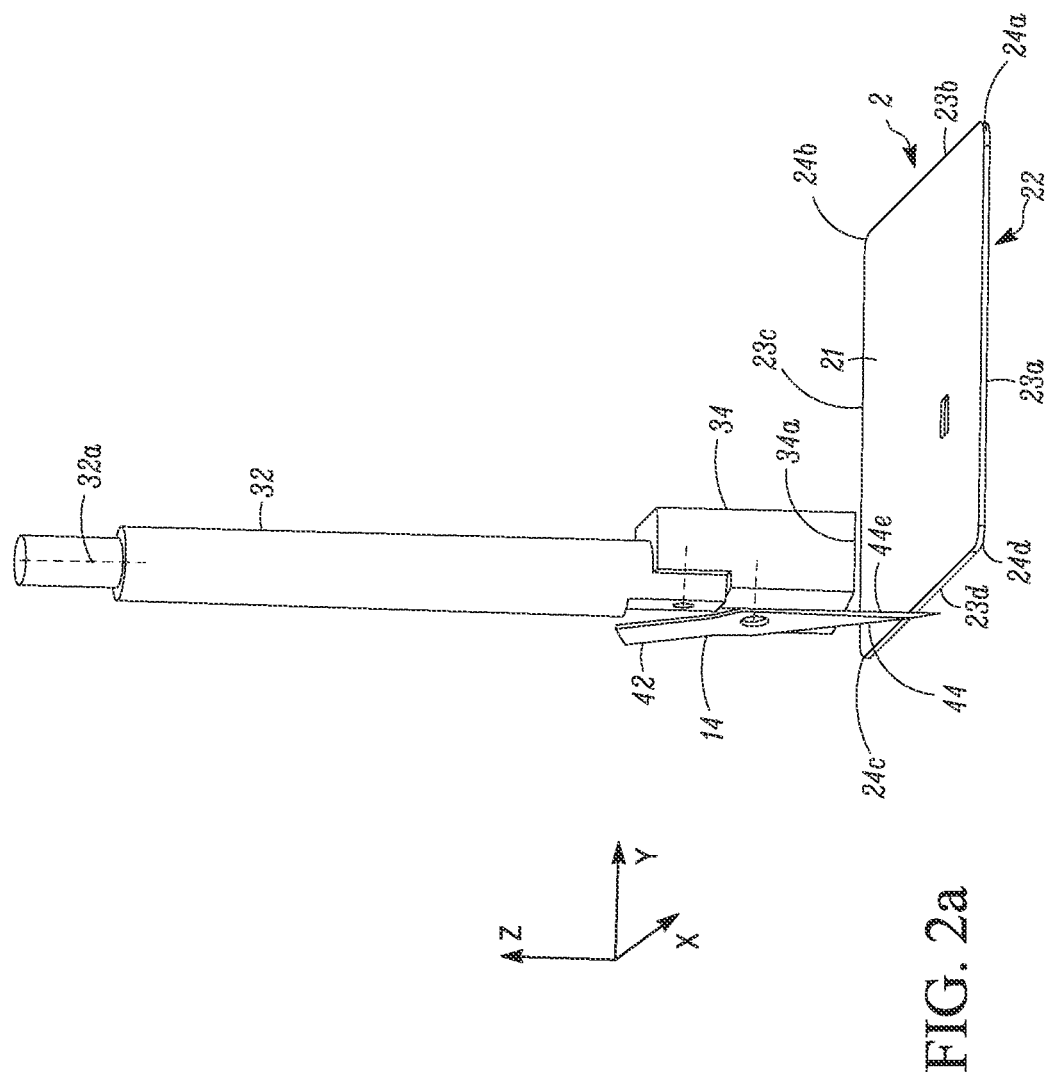
FIG. 2a illustrates a perspective view of a trimming device positioned with respect to a personalized document during trimming an edge of the personalized document, according to one embodiment.

Systems and methods for utilizing a trimmer to trim an edge of a personalized document, are provided. The personalized document includes, but is not limited to, identification cards, driver's licenses, credit and debit cards, and the like. The term "personalized" is intended to encompass documents that have personalization applied to them, as well as documents that do not have any applied personalization and that are to be personalized.

The embodiments described herein can trim an overhanging part of an overlay laminated on a major surface of a personalized document such as, for example, a plastic card.

The overlay can have a thickness, for example, from about 0.0005" to about 0.005" (or about 0.5 mil to about 5 mil). The embodiments described herein can trim an edge and/or a corner of a plastic card to cut into the periphery of the overlay to form a bevel feature, which can make it difficult to remove the overlay from the plastic card.

FIGS. 1a-e illustrate a system 100 for preparing a personalized document 2, according to one embodiment. In the embodiment of FIG. 1, the personalized document 2 is a card having a generally rectangular shape. The card 2 can be made of plastic. An overlay was laminated on a top surface of the card 2. In some embodiments, the overlay can be made of, for example, polyester, polycarbonate and/or photopolymer. The overlay can have a thickness above, for example, about 0.5 mil. An overlay can also be laminated on a bottom surface of the card 2 that is opposite the top surface. The overlay can have an overhanging part that overhangs an edge of the card 2. The edge refers to the periphery of the top/bottom surface of card 2. The system 100 includes a trimming unit 10 configured to trim the edge of the card 2 and the overhanging part of the overlay from the card 2 can be removed by trimming.

In some embodiments, the system 100 can be a part of a desktop card printer for producing personalized documents. In some embodiments, the system 100 can be a part of a central card issuance system that can produce personalized documents.

The system 100 can further include a laminating unit 20 (shown in FIG. 1a only) positioned at an upstream position with respect to the trimming unit 10. The laminating unit 20 is configured to laminate an overlay on a major surface of the card 2. In some embodiments, the laminated overlay can have a periphery overhanging the edge of the card 2. Then the card 2 is transferred from the laminating unit 20 to the trimming unit 20 to remove the overhanging periphery. It is to be understood that the laminating unit 20 and the trimming unit 10 may not be directly connected and one or more processing units may be positioned therebetween.

The trimming unit 10 can include a mounting mechanism 12 to mount the card 2. The mounting mechanism 12 includes a vacuum plate 122 having a top surface contacting a bottom surface of the card 2. The mounted card 2 is positioned in a XY plane and faces in the direction of a Z axis. The working mechanism of a vacuum plate for mounting an object is known. The mounting mechanism 12 can rotate the card 2 in the XY plane to align the card 2 with respect to an X axis and a Y axis of the XY plane. In some embodiments, the card 2 can be aligned with respective edges being parallel to the X axis and the Y axis, respectively. It is to be understood that mounting mechanisms other than a vacuum plate can be used.

The trimming unit 10 further includes a trimming device 14 that is mounted on a manipulating mechanism 16. The trimming device 14 is manipulated by the manipulating mechanism 16 and is capable of moving around the edge of the card 2 in the XY plane to trim at least a portion of the edge thereof. One embodiment of the trimming device 14 is illustrated in FIG. 2a to be discussed further below.

The manipulating mechanism 16 includes an X axis manipulator 164 for moving the trimming device 14 along the X axis, a Y axis manipulator 162 for moving the trimming device 14 along the Y axis, a Z axis manipulator 166 for moving the trimming device 14 along the Z axis, and a Z axis rotation manipulator 168 for rotating the trimming device 14 around the Z axis. The X axis manipulator 164, the Y axis manipulator 162, and the Z axis manipulator 166 each can include a lead screw that extends along the respective axis. The manipulating mechanism 16 can also include one or more motors for providing a driving force for the X, Y and Z axis manipulators 164, 162 and 166, and the Z axis rotation manipulator 168.

The manipulating mechanism 16 further includes a shaft 32 (shown in FIG. 2a) that extends along a shaft axis 32a thereof. The shaft axis 32a of the shaft 32 is positioned generally parallel to the axis Z. The shaft 32 is connected to the X axis manipulator 164, the Y axis manipulator 162, the Z axis manipulator 166, and the Z axis rotation manipulator 168. The shaft 32 is manipulated by the X axis manipulator 164 to move linearly along the X axis, by the Y axis manipulator 162 to move linearly along the Y axis, by the Z axis manipulator 166 to move linearly along the Z axis, and by the Z axis rotation manipulator 168 to rotate around the shaft axis 32a. The trimming device 14 is mounted to the shaft 32 via a holder block 34.

The trimming unit 10 can further include an optional vision location mechanism 18 for locating the edge and/or corner of the card 2. The vision location mechanism 18 includes a vision device 182 facing the card 2. The vision device 182 is mounted on the manipulating mechanism 16 and manipulated by the manipulating mechanism 16 to move along the X axis, the Y axis, and/or the Z axis, and/or rotate around the Z axis. The vision device 182 can be, for example, a camera that has a resolution of a dimension of about 0.001" (about 0.0254 mm) or better. Optionally, the vision location mechanism 18 can include a lighting device to illuminate the card 2, for example, from below. The lighting device can be, for example, a light-emitting diode (LED).

In some embodiments, the system 100 can include a microprocessor (e.g., a Central Processing Unit or CPU, not shown) for controlling the trimming unit 10 where the vision location mechanism 18 can be coupled to the microprocessor.

The trimming unit 10 further includes a base 11 where components of the trimming unit 10 (e.g., the mounting mechanism 12, the trimming device 14, the manipulating mechanism 16, the vision location mechanism 18, etc.) are mounted thereon.

In some embodiments, the vision device 182 can be moved, via the manipulating mechanism 16, from a home position to preset locations to optically locate the edges and/or corners of the card 2 with respect the X and Y axes. Then the trimming device 14 can be moved, by the manipulating mechanism 16, along the Z axis a preset distance to a "start" position. Then the trimming device 14 can move along the edge of the card 2 in a direction generally parallel to the XY plane to trim the edges and/or corners of the card 2.

In the embodiments of FIGS. 2a-c and 3a-c, the card 2 to be trimmed by the trimming device 14 has a generally rectangular shape including, for example, four side edges 23a-d and four round corners 24a-d at respective junctions of the side edges. The card 2 has a first major surface 21 and a second major surface 22 opposite the first major surface 21. It is to be understood that the card 2 can have other suitable shapes.

Figure 2B:
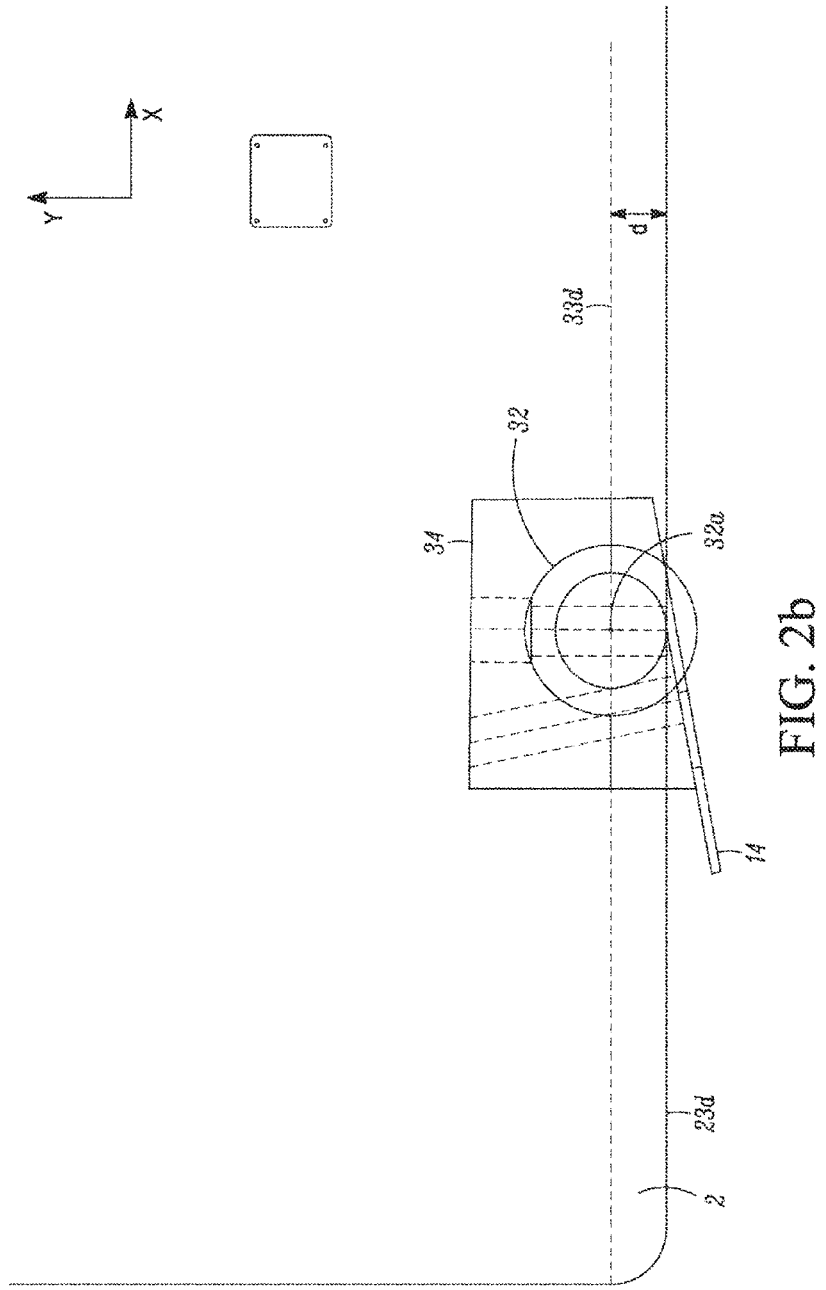
Figure 2C:
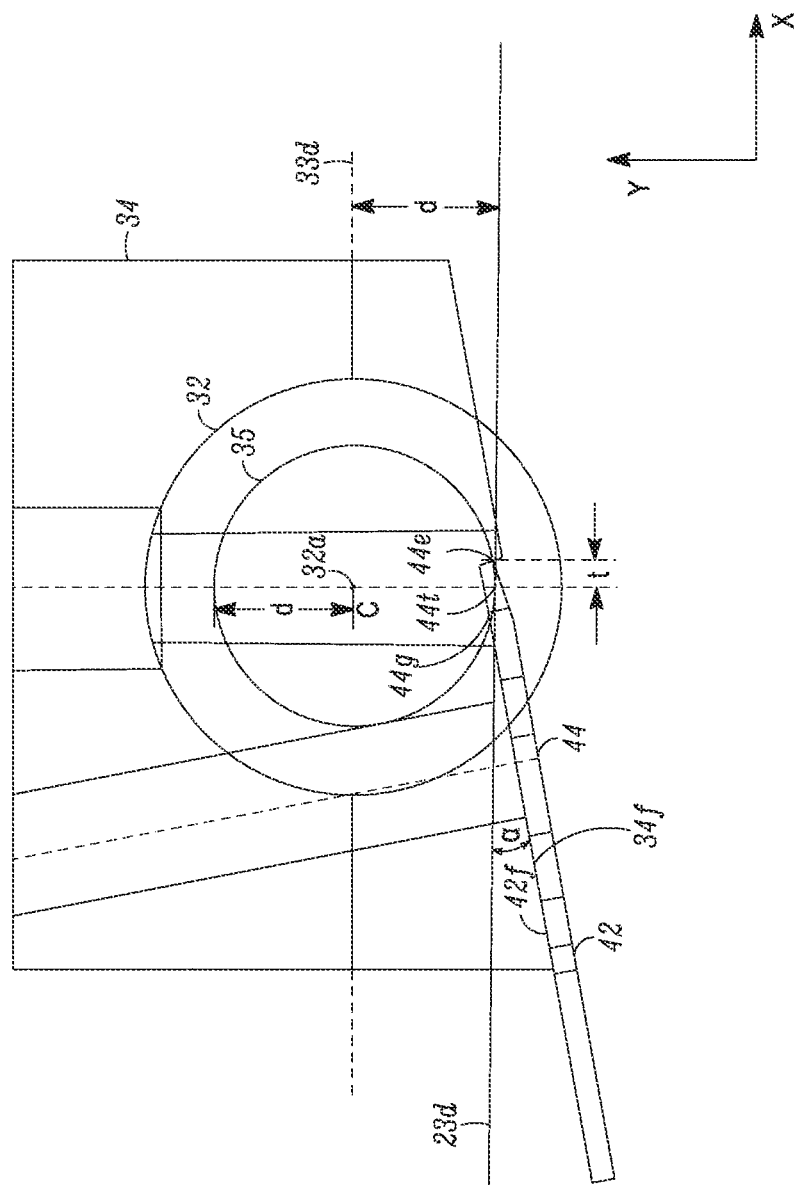
FIG. 2c illustrates a partial enlarged view of FIG. 2b.

The card 2 and the shaft 32 are positioned with respect to each other so that the shaft axis 32a of the shaft 32 is positioned generally perpendicular to the major surfaces 21 and 22 of the card 2. FIGS. 2a-c illustrate the trimming device 14 positioned with respect to the card 2 to trim one of the side edges, e.g., edge 23d, according to one embodiment.

In the embodiments described herein, the trimming device 14 is a mechanical trimming device. It is to be understood that the trimming device 14 can be other types of trimming devices such as, for example, optical trimming devices, electrical trimming devices, thermal trimming devices, etc., that are suitable to trim the edges and/or corners of a personalized document.

In some embodiments, the trimming device 14 can include a laser (not shown) that is configured to trim at least a portion of the periphery of the card 2. The laser can emit a light beam in a direction generally perpendicular to the top/bottom surface of card 2. The laser can be manipulated by, e.g., the manipulating mechanism 16, to move around the edge of the card 2 in the XY plane to trim the edge.

The trimming device 14 shown in FIGS. 2a-c and 3a-c includes a blade 44 having a blade body 42 mounted on the holder block 34. The blade body 42 extends along the Z axis and beyond an end 34a of the holder block 34.

As shown in FIG. 2c, the holder block 34 defines a mounting surface 34f and the blade body 42 defines a side surface 42f. The blade 44 is mounted to the holder block 34 with the side surface 42f contacting the mounting surface 34f. During a trimming process, the holder block 34 is positioned with respect to the card 2 so that the mounting surface 34f forms an angle α with respect to the side edge 23d of the card 2. The angle α can be, for example, about 11°.

As shown in FIGS. 2a, 2c, 3c and 4, the blade body 42 further defines a guide surface 44g and a blade edge 44e defined at an end of the guide surface 44g. The guide surface 44g is angled with respect to the mounting surface 34f and the side surface 42f. During a trimming process, the blade 44 is pressed against the side edge of the card 2 and the guide surface 44g is aligned generally parallel to the side edge, e.g., 23d of the card 2.

The blade edge 44e can trim the side edge 23d when the shaft 32 moves linearly along a line 33d generally parallel to the side edge 23d. The shaft 32 is positioned with respect to the card 2 with the shaft axis 32a being offset with respect to the side edge of the card 2. For example, the distance between the line 33d and the side edge 23d is d.

Figure 3A:
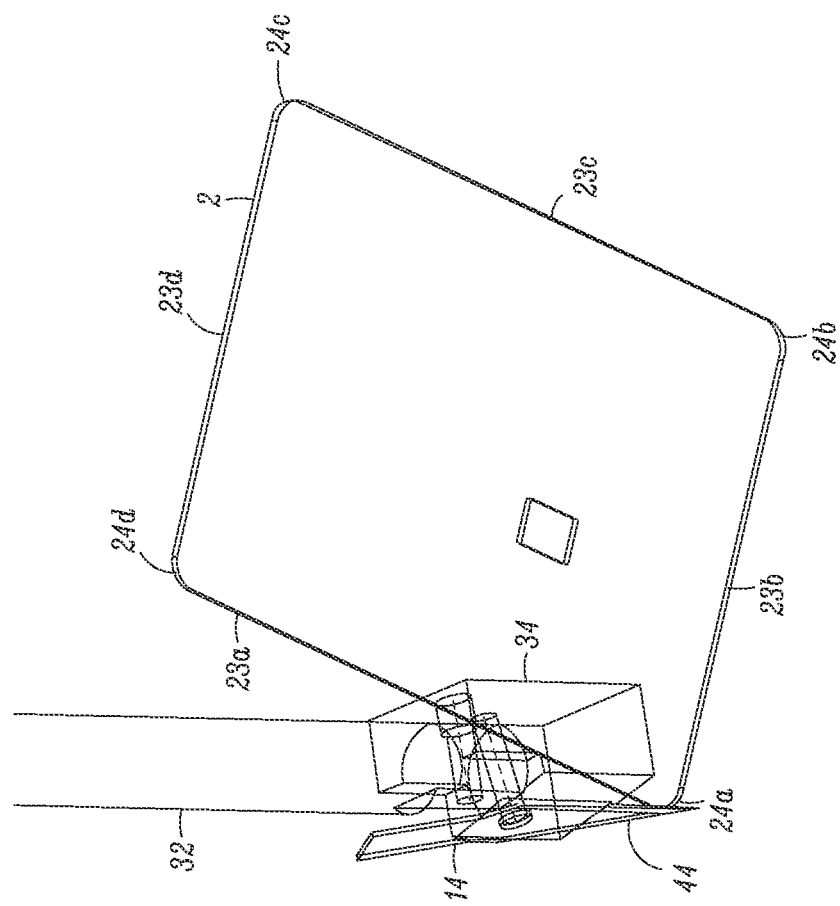
FIG. 3a illustrates a perspective view of the trimming device of FIG. 2a positioned with respect to the personalized document during trimming a round corner of the personalized document.
Figure 3B:
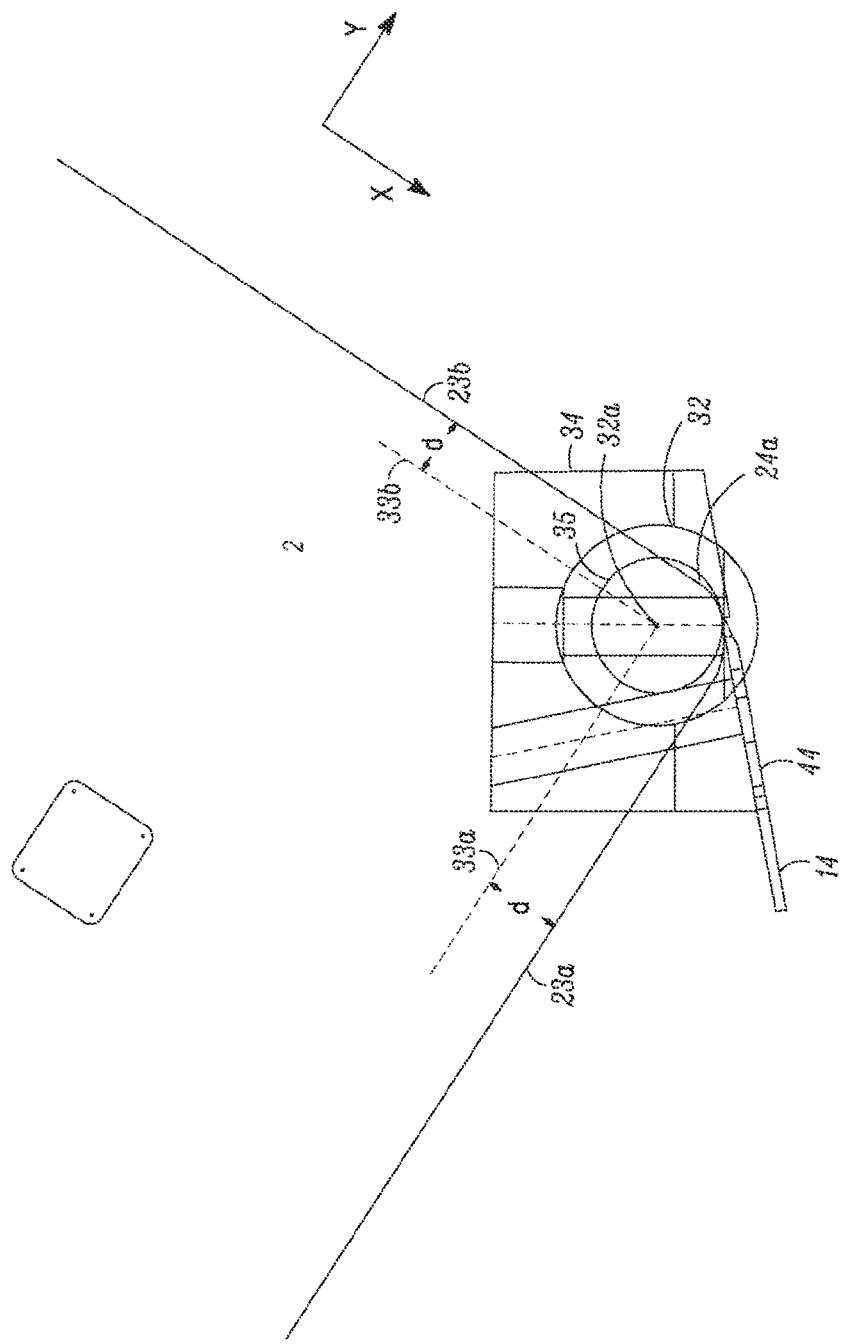
Figure 3C:
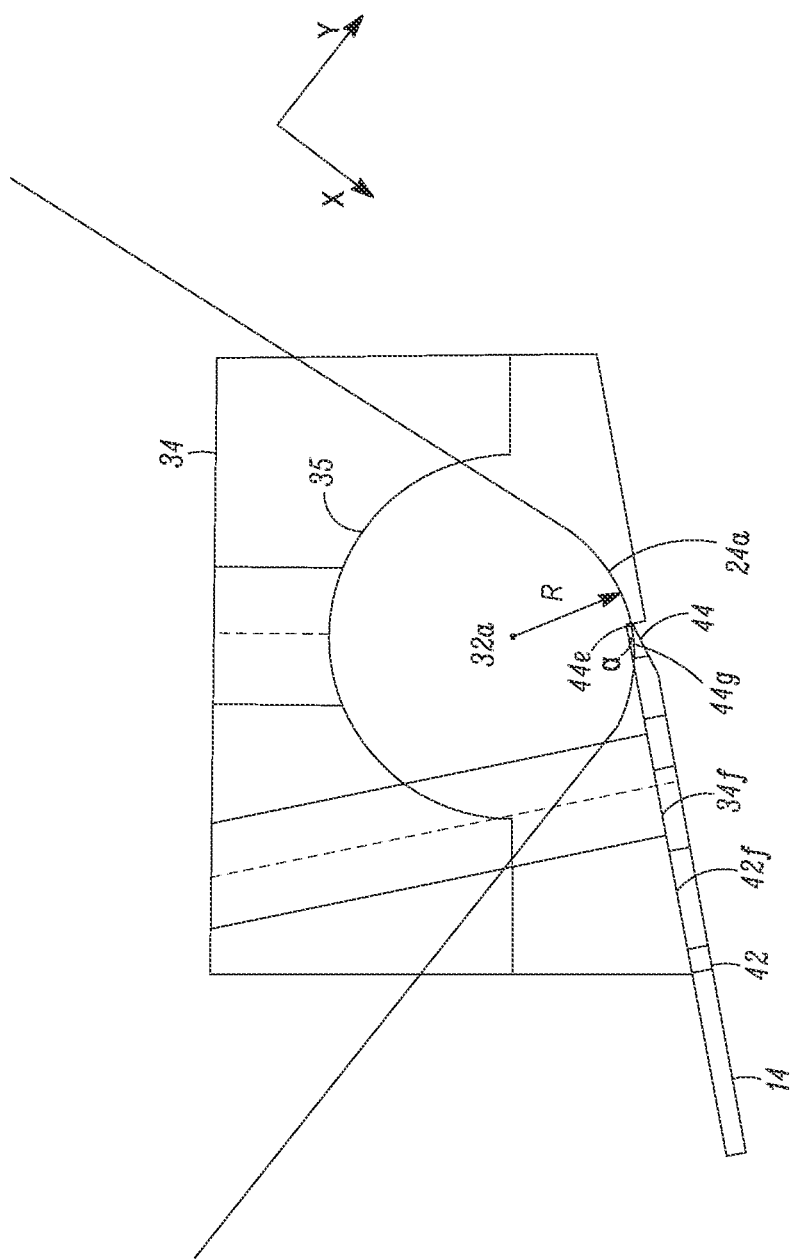
FIG. 3c illustrates a partial enlarged view of FIG. 3b.
Figure 4:
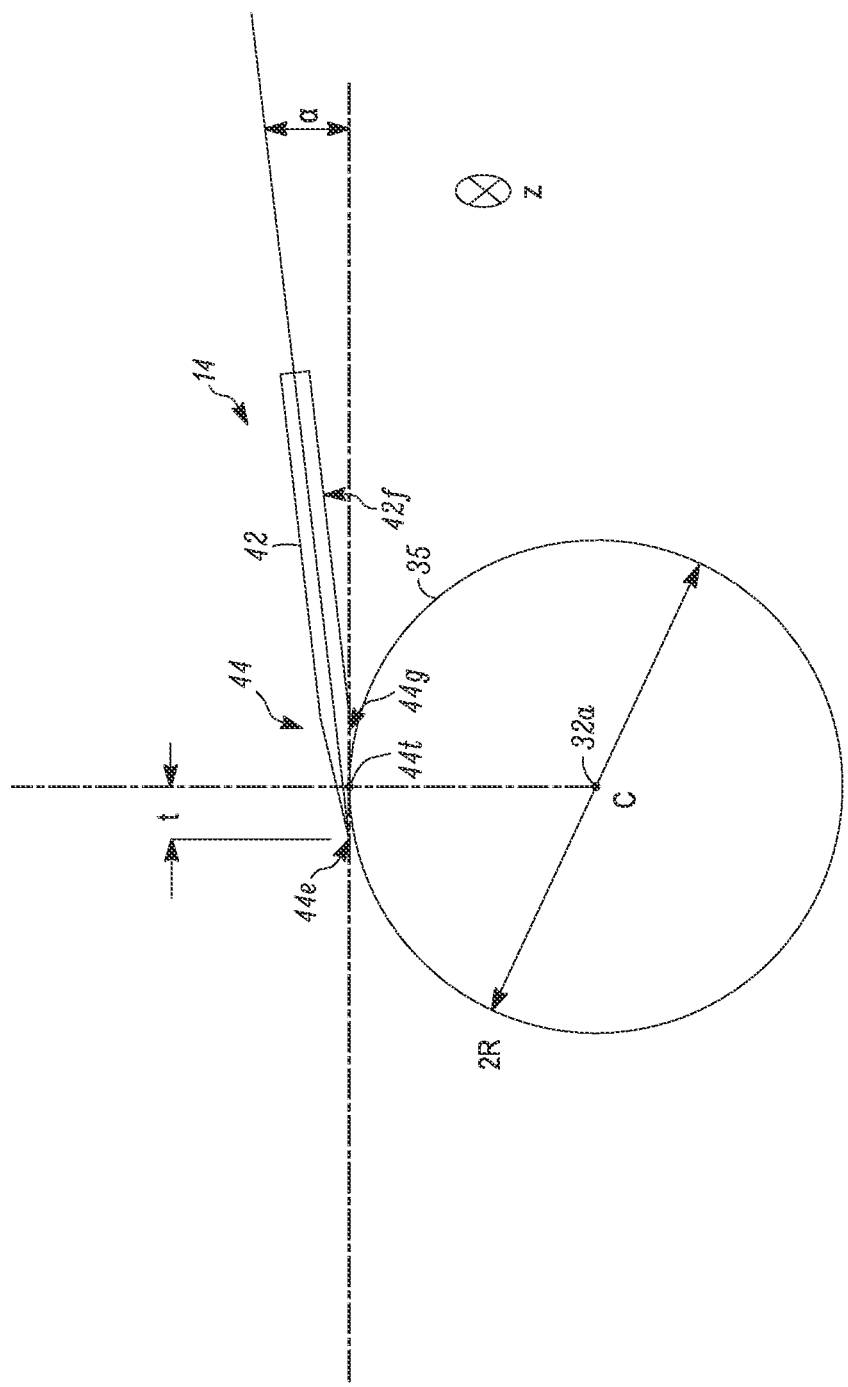
FIG. 4 is a schematic diagram of positioning a trimming device with respect to a personalized document to trim an edge thereof, according to one embodiment.

As shown in FIGS. 2c, 3c and 4, in the XY plane, the guide surface 44g is tangent with respect to a circle 35 that has the radius of d and the center C at the intersection of the shaft axis 32a and the line 33d. The point of tangency is 44t. The blade edge 44e is positioned at an advanced position with respect to the point of tangency 44t. The distance between the point of tangency 44t and the blade edge 44e is t. The distance t can have a range of, for example, about 0.005" to about 0.025".

As shown in FIG. 3a, 3b or 3c, when the shaft 32 moves along a line 33a to a round corner, e.g., corner 24a of the card 2, the shaft 32 rotates about 90° around the shaft axis 32a and the blade 44 trims the respective round corner 24a. Then the shaft 32 continues to move along a line 33b to trim the side edge 23b. During the trimming, the shaft axis 32a of the shaft 32 is offset with respect to the side edges, e.g., 23a and 23b, of the card 2. The distance d between the line 33a and the side edge 23a, or the distance d between the line 33b and the side edge 23b, is substantially equal to the radius R of the round corner 24a that can be, for example, about 0.125". In this way, the blade edge 44e can be advanced with respect to the point of tangency 44t, and the guide surface 44g of the blade 44 can be always tangent with respect to the surface of the round corner, e.g., 24a when the blade edge 44e trims the respective round corner of the card 2.

FIG. 4 further illustrates the relative position between the trimming device 14 and the side edges 23a-d or the round corners 24a-d of the card 2 when the blade 44 trims the respective side edges or round corners. The guide surface 44g of the blade 44 is tangent with respect to the circle 35 that has the radius of R and the center C at the intersection of the shaft axis 32a and the XY plane. In this way, the guide surface 44g is aligned parallel to and contacts the side edges 23a-d of the card 2 when the trimming device 14 trims the respective side edges, as shown in FIGS. 2a-c, the blade edge 44e is advanced with respect to the point of tangency 44t, and the guide surface 44g is tangent with respect to the surface of the round corners 24a-d of the card 2 when the trimming device 14 trims the respective round corners, as shown in FIGS. 3a-c.

In some embodiments, the trimming device 14 can move along the Z axis and move along the X or Y axes to press the guide surface 44g of the blade 44 against one of the side edges, e.g., edge 23d, of the card 2. Then the trimming device 14 can move from a "start" point linearly along the X axis or the side edge 23d to have the blade edge 44e to trim the side edge 23d. At the corner 24d, the trimming device 14 can rotate about 90° around the shaft axis 32a to have the blade edge 44e to trim the corner 24d. Then the trimming device 14 can move linearly along the Y axis or the side edge 23a to have the blade edge 44e to trim the side edge 23a. At the corner 24a, the trimming device 14 can rotate about 90° around the shaft axis 32a to have the blade edge 44e to trim the corner 24a. Then the trimming device 14 can move linearly along the −X axis or the side edge 23b to have the blade edge 44e to trim the side edge 23b. At the corner 24b, the trimming device 14 can rotate about 90° around the shaft axis 32a to have the blade edge 44e to trim the corner 24b. Then the trimming device 14 can move linearly along the −Y axis or the side edge 23c to have the blade edge 44e to trim the side edge 23c. At the corner 24c, the trimming device 14 can rotate about 90° around the shaft axis 32a to have the blade edge 44e to trim the corner 24c. Then the trimming device 14 can linearly along the X axis or the side edge 23d and trim the side edge 23d till back to the "start" point.

In some embodiments, the trimming device 14 can trim a portion of the periphery of the card 2, for example, one or more of the side edges 23a-d along the X and/or Y axes.

In some embodiments, the trimming device 14 can move along the edges of a card in a clockwise or counterclockwise direction in the XY plane. In some embodiments, one trimming device can be used to trim two or more edges of the card at the same time. In some embodiments, more than one trimming devices can be used.

In some embodiments, the blade 44 can have a flexibility to bend, which allows to accommodate a positioning error of, for example, about 0.050", between the blade 44 and the side edge of the card 2.

In some embodiments, the blade 44 can be pressed against the side edge of the card 2 and the blade edge 44e can be tilted with respect the Z axis to cut into the periphery of an overlay laminated on the top surface 21 to form a bevel feature into the overlay. This bevel feature can make it difficult to remove the overlay from the card 2.

In some embodiments, the blade 44 can be pressed against the side edge of the card 2 to remove overhanging parts of laminated overlays on both the top surface 21 and the bottom surface 22 at the same time.

In some embodiments, the removed overhanging parts of the overlay can be collected and recycled.

In some embodiments, a trimming device such as, for example, the trimming device 14, can be used to trim the card 2 itself to obtain a desired periphery of the card 2.

In some embodiments, a trimming device such as, for example, the trimming device 14, can be used to divide a substrate into one or more personalized documents such as, for example, the card 2.

The embodiments disclosed in this application are to be considered in all respects as illustrative and not limitative. The scope of the claimed invention is indicated by the appended claims rather than by the foregoing description; and all changes which come within the meaning and range of equivalency of the claims are intended to be embraced therein.

The invention claimed is:

1. A method comprising:
    positioning a trimming device with respect to a personalized document that has a major surface and an edge being a periphery of the major surface; and
    trimming, via the trimming device, at least a portion of the edge of the personalized document by moving the trimming device along the edge of the personalized document in a direction generally parallel to the major surface;
    wherein the trimming device is a mechanical trimming device that includes a blade mounted on a rotatable shaft, the blade includes a guide surface and a blade edge defined at an end of the guide surface, and the shaft is rotatable about a rotation axis that is generally perpendicular to the major surface of the personalized document; and
    further including rotating the blade edge by rotating the rotatable shaft about the rotation axis to trim a round corner of the personalized document; and
    the rotation axis of the rotatable shaft is positioned with an offset with respect to the edge of the personalized document, and the blade edge is positioned at an advanced position ahead of a point of tangency of the guide surface with respect to the round corner when rotating the blade edge.

2. The method of claim 1, further comprising:
    laminating an overlay on the major surface of the personalized document before trimming the edge of the personalized document.

3. The method of claim 2, wherein trimming the edge of the personalized document includes removing a periphery of the overlay, the periphery of the overlay overhanging the edge of the personalized document.

4. The method of claim 1, wherein moving the trimming device includes linearly moving the blade along an X axis or a Y axis that are orthogonal to each other, and the rotation axis is generally parallel to a Z axis orthogonal to the X and Y axes.

5. The method of claim 1, further comprising aligning the guide surface of the blade parallel to the edge of the personalized document and pressing the guide surface against the edge of the personalized document.

6. The method of claim 1, further comprising tilting the blade edge to cut a bevel into the personalized document.

* * * * *